(12) United States Patent
Yang et al.

(10) Patent No.: US 10,889,694 B2
(45) Date of Patent: Jan. 12, 2021

(54) METHOD AND COMPOSITION FOR PREPARING POLYAMIDE POWDERS

(71) Applicant: Taiwan Green Point Enterprises Co., Ltd., Taichung (TW)

(72) Inventors: Chia-Hung Yang, Taichung (TW); Yu-Pao Huang, Taichung (TW); Hsing-Fu Yeh, Taichung (TW); Yao-Tang Ke, Taichung (TW); Feng-Lin Chen, Taichung (TW); Yung-Chih Chen, Taichung (TW); Yi-Chung Su, Taichung (TW)

(73) Assignee: Taiwan Green Point Enterprises Co., Ltd., Taichung (TW)

( * ) Notice: Subject to any disclaimer, the term of this patent is extended or adjusted under 35 U.S.C. 154(b) by 0 days.

(21) Appl. No.: 16/458,770

(22) Filed: Jul. 1, 2019

(65) Prior Publication Data

US 2020/0010626 A1    Jan. 9, 2020

(30) Foreign Application Priority Data

Jul. 6, 2018   (CN) .......................... 2018 1 0737968

(51) Int. Cl.
*C08J 3/14*   (2006.01)
*C08J 3/11*   (2006.01)
(Continued)

(52) U.S. Cl.
CPC .................. *C08J 3/14* (2013.01); *C08J 3/096* (2013.01); *C08J 3/11* (2013.01); *C08J 3/215* (2013.01);
(Continued)

(58) Field of Classification Search
CPC ........................................................ C08J 3/14
See application file for complete search history.

(56) References Cited

U.S. PATENT DOCUMENTS

2012/0264877 A1   10/2012  Hager et al.

FOREIGN PATENT DOCUMENTS

| CN | 102399371 A | 4/2012 | |
|----|-------------|--------|---|
| CN | 105694068 A | 6/2016 | |
| GB | 2226319 A * | 6/1990 | ............... C09D 5/03 |

OTHER PUBLICATIONS

Machine Translation of CN102399371A. Apr. 4, 2012. (Year: 2012).*

(Continued)

*Primary Examiner* — Stephen E Rieth
(74) *Attorney, Agent, or Firm* — Young Basile Hanlon & MacFarlane, P.C.

(57) ABSTRACT

A method of preparing polyamide (PA) powders includes the steps of: heating a composition including PA granules, a nucleating agent and an organic solvent under normal pressure to $T_1$ not lower than melting point ($T_m$) of PA granules and maintaining at $T_1$ to dissolve PA granules; cooling the heated composition to $T_2$ to nucleate the dissolved PA granules and maintaining at $T_2$ to crystallize, where 15° C.$\leq T_m - T_2 \leq$33° C.; cooling the crystallization product to precipitate PA; and washing the precipitated product to remove the organic solvent. The weight ratio of PA granules to the nucleating agent is 100:1, and the weight ratio of PA granules to the organic solvent ranges from 0.11 to saturation solubility of PA granules in the organic solvent.

12 Claims, 15 Drawing Sheets

(51) Int. Cl.
*C08J 3/09* (2006.01)
*C08K 3/36* (2006.01)
*C08K 3/22* (2006.01)
*C08J 3/215* (2006.01)

(52) U.S. Cl.
CPC .................. *C08K 3/22* (2013.01); *C08K 3/36* (2013.01); *C08K 2003/2241* (2013.01)

(56) References Cited

OTHER PUBLICATIONS

Song, J. et al. Journal of Polymer Science: Part B: Polymer Physics, 2005, 43, 2326-2333. (Year: 2005).*
Search Report appended to an Office Action issued to Taiwanese counterpart application No. 107133249 by the TIPO dated Nov. 13, 2019.

* cited by examiner

METHOD AND COMPOSITION FOR PREPARING POLYAMIDE POWDERS

CROSS-REFERENCE TO RELATED APPLICATION

This application claims priority of Chinese Invention Patent Application No. 201810737968.0, filed on Jul. 6, 2018.

FIELD

The disclosure relates to a method and a composition for preparing polyamide powders.

BACKGROUND

Polyamide (PA), also known as nylon, is a macromolecule with amine and carboxyl repeating units linked by amide bonds. PA is commonly engineered as a plastic material, which is widely used in automobiles, mobile phones, textiles, sportswear, etc.

Selective laser sintering (SLS) is an additive three-dimensional (3D) printing technique that uses a laser as a power source to sinter plastic powdered material (typically polyamide), so as to bind the material together to create a solid member (such as plastics, casting molds, models, etc.) having a desired 3D shape.

The PA powders commonly used in SLS are usually prepared by a solvent precipitation method. For example, Chinese Invention Patent Application Publication No. 105694068 A discloses a method of preparing PA powders as follows. First, polyamide (such as PA12, PA6, PA11, PA612 and PA1012), methanamide, and optional $TiO_2$ were added into a reaction kettle, and then heated under a pressure of 0.8 MPa to 1.2 MPa and to a temperature that is 25° C. to 80° C. higher than a precipitation temperature of PA, followed by maintaining the pressure and temperature for 0.5 hours to 1.5 hours, so as to dissolve PA. The resultant mixture was then subjected to a 3-stage cooling treatment that includes cooling at a first rate of 0.5° C./min to 2.0° C./min to a temperature that is 14° C. to 16° C. higher than the precipitation temperature of PA, followed by cooling at a second rate of 0.1° C./min to 0.4° C./min to the precipitation temperature of PA, and then cooling at a third rate of 1° C./min to 5° C./min to room temperature, thereby precipitating the PA. After centrifugation, the thus formed precipitate was washed to obtain the PA powders.

Chinese Invention Patent Application Publication No. 102399371 A also discloses a method of preparing PA powders for used in SLS. The method includes subjecting polyamide (such as PA6, PA11, PA12, PA66, PA610, PA612, PA1010, PA1012 and PA1212), ethanol, and a heterogeneous nucleating agent (such as $Al_2O_3$, $TiO_2$, ZnO, $SiO_2$, $ZrO_2$, $B_2O_3$, etc.) that were added into a reaction kettle to heating to a temperature of 145° C. and under a pressure of 0.2 MPa, followed by maintaining the temperature and pressure for 1 hour to dissolve PA. The mixture thus obtained was cooled with a cold water at a first rate of −1.3° C./min to 120° C. to 125° C., and then at a second rate of −0.04° C./min to −0.1° C./min to 100° C. for 30 minutes to precipitate PA, followed by maintaining at the temperature for 40 minutes to 120 minutes. After the reaction kettle was cooled with the cold water to room temperature, the thus formed precipitate was subjected to centrifugation, followed by vacuum drying for 10 hours, so as to obtain the PA powders.

Although the aforementioned prior arts disclose the preparation processes of PA powders, the PA powder thus obtained in the latter prior art has a wide range of particle diameter and an unsatisfactory bulk density (e.g., lower than 0.4 g/cm³), which may result in poor powder flowability. In addition, since the pressure of the reaction kettle needs to be controlled during the preparation process by introducing nitrogen gas, reaction space in the reaction kettle would be restricted and thus, the amount of the PA powders obtained in unit reaction space might be reduced. Furthermore, these prior arts necessitate the use of pressure-applying instrument in the preparation processes, therefore increasing the cost and time for obtaining the PA powder.

SUMMARY

Therefore, an object of the disclosure is to provide a method of preparing polyamide powders that can alleviate at least one of the drawbacks of the prior art.

Another object of the disclosure is to provide a composition for preparing polyamide powders that can alleviate at least one of the drawbacks of the prior art.

According to the disclosure, the method includes the steps of:

(a) heating a composition including polyamide granules, a nucleating agent and an organic solvent to a first temperature ($T_1$) equal to or higher than the melting point ($T_m$) of the polyamide granules under normal pressure, followed by maintaining at the first temperature for a first time period to dissolve the polyamide granules in the organic solvent;

(b) cooling the heated composition to a second temperature ($T_2$) to nucleate the dissolved polyamide granules, followed by maintaining at the second temperature ($T_2$) to crystallize, so as to form a crystallization product, in which 15° C.$\leq T_m - T_2 \leq$33° C.;

(c) cooling the crystallization product to precipitate polyamide, so as to form a precipitated product; and (d) washing the precipitated product to remove the organic solvent, wherein the weight ratio of the polyamide granules to the organic solvent ranges from 0.11 to saturation solubility of the polyamide granules in the organic solvent, and the weight ratio of the polyamide granules to the nucleating agent is 100:1.

According to the disclosure, the composition includes polyamide granules, a nucleating agent and an organic solvent having a boiling point ranging from 190° C. to 209° C. The weight ratio of the polyamide granules to the organic solvent ranges from 0.11 to saturation solubility of the polyamide granules in the organic solvent. The weight ratio of the polyamide granules to the nucleating agent is 100:1.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Unless defined otherwise, all technical and scientific terms used herein have the meaning commonly understood by a person skilled in the art to which the present disclosure belongs.

One skilled in the art will recognize many methods and materials similar or equivalent to those described herein, which could be used in the practice of the present disclosure. Indeed, the present disclosure is in no way limited to the methods and materials described.

The present disclosure provides a composition for preparing polyamide (PA) powders, which includes polyamide granules, a nucleating agent and an organic solvent. The weight ratio of the polyamide granules to the organic solvent ranges from 0.11 to saturation solubility of the polyamide granules in the organic solvent. The weight ratio of the polyamide granules to the nucleating agent is 100:1.

It should be noted that, when the composition includes insufficient PA granules, the PA powders prepared therefrom may have a relatively small particle diameter and may be in the form of fragments with non-spherical shape. When the composition includes too much PA granules which exceeds the saturation solubility of PA granules in the organic solvent, the PA powders prepared therefrom would form concretion, thereby affecting the bulk density of the PA powders.

In certain embodiments, the organic solvent has a boiling point ranging from 190° C. to 209° C. In an exemplary embodiment, the organic solvent is N-methyl-2-pyrrolidone (NMP).

In certain embodiments, the PA granules are selected from PA12 and PA1012. In other embodiments, the PA granules are selected from PA11 and PA1212. In an exemplary embodiment, the PA granules are PA12, and the weight ratio of PA12 to NMP ranges from 0.125 to 0.2. In another exemplary embodiment, the PA granules are PA1012, and the weight ratio of PA1012 to NMP ranges from 0.11 to 0.17.

In certain embodiments, the nucleating agent is $SiO_2$. Alternatively, the nucleating agent is a combination of $SiO_2$ and $TiO_2$, and $TiO_2$ is present in an amount equal to or higher than that of $SiO_2$. In an exemplary embodiment, $TiO_2$ is present in an amount ranging from 50% to 60% based on the total weight of the nucleating agent.

Figure 1:
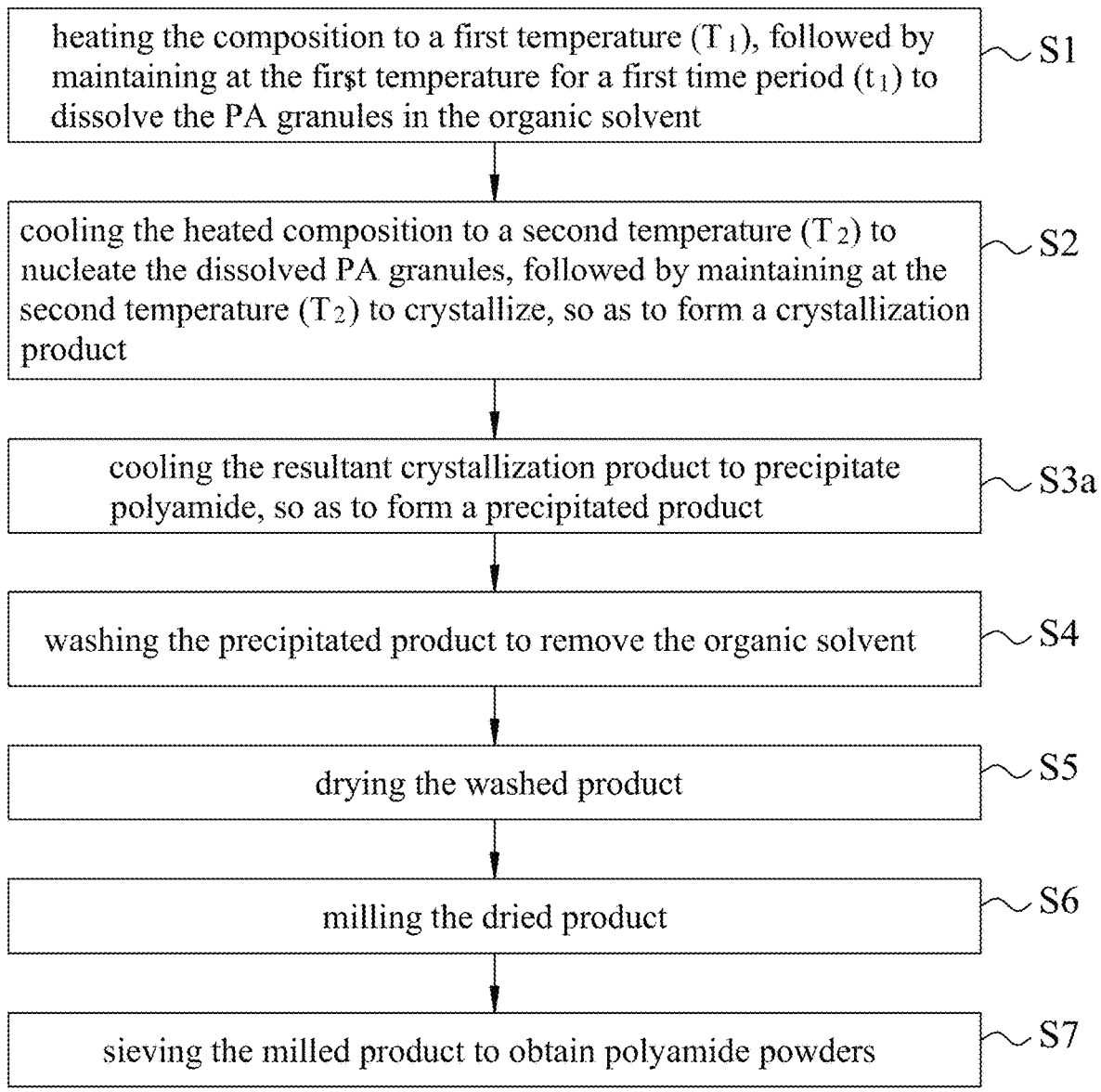
FIG. 1 is a flow chart illustrating a first embodiment of a method of preparing polyamide (PA) powders according to the disclosure.
Figure 2:
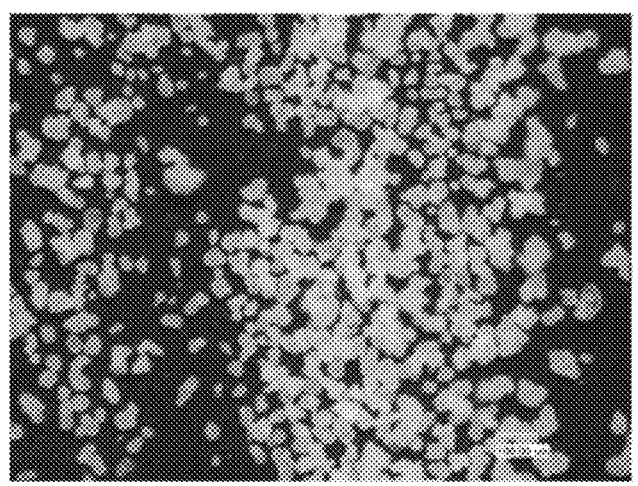
FIGS. 2 to 10 are optical microscope (OM) images respectively showing the appearances of the PA powders of Comparative Example 1 (CE1) to CE8 and CE10.
Figure 3:
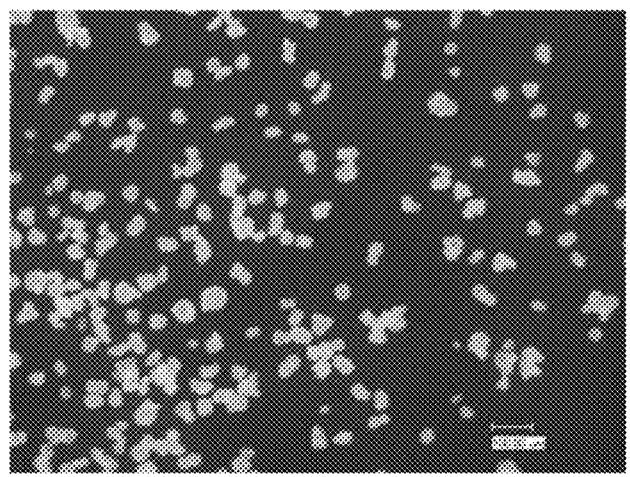
Figure 4:
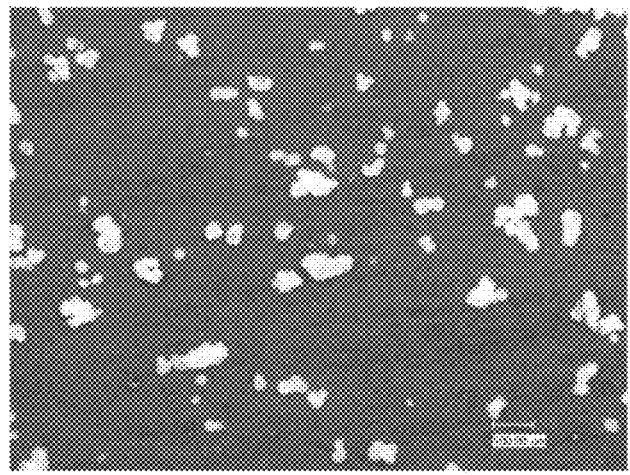
Figure 5:
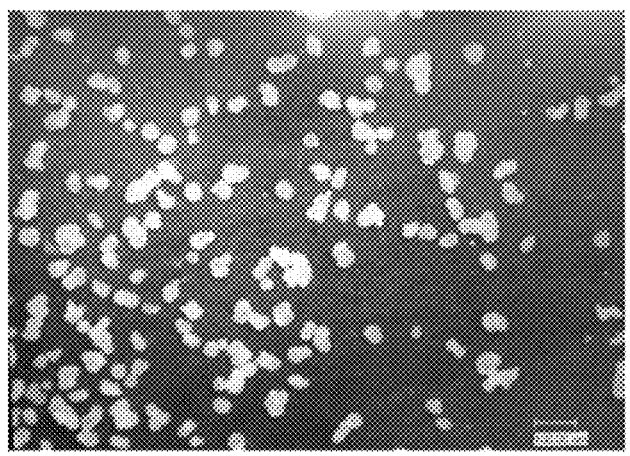
Figure 6:
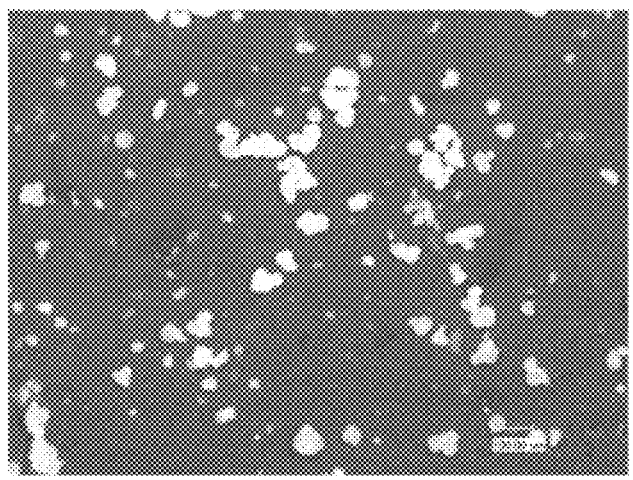
Figure 7:
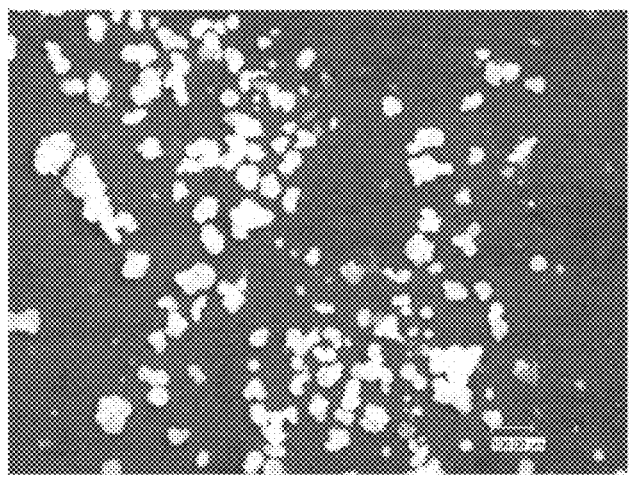
Figure 8:
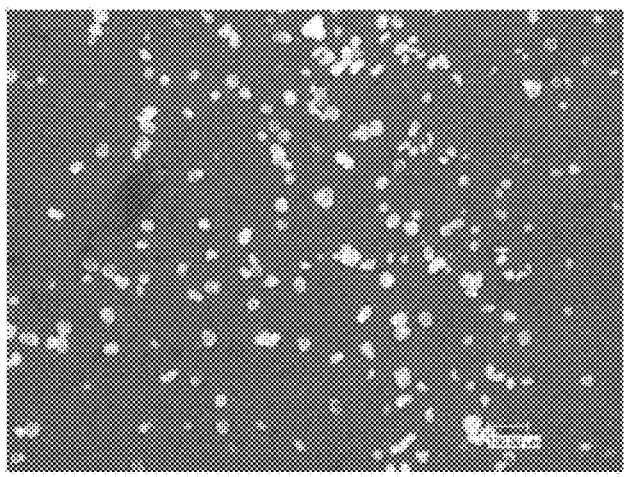
Figure 9:
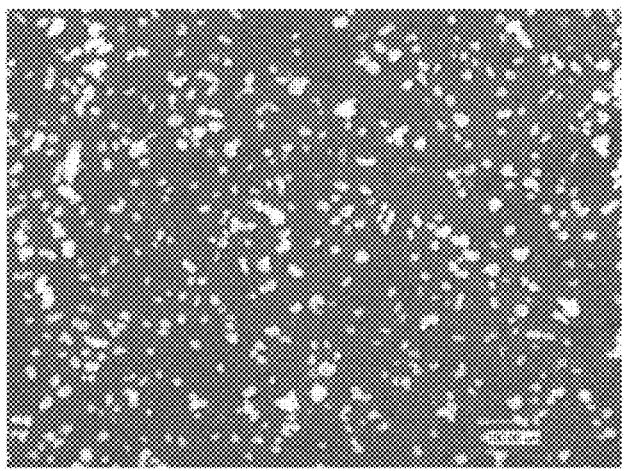

Referring to FIG. 1, a first embodiment of a method of preparing polyamide (PA) powders according to the disclosure includes the following consecutive steps S1 to S7.

Step S1: heating the aforementioned composition to a first temperature ($T_1$), followed by maintaining at the first temperature for a first time period ($t_1$) to dissolve the PA granules in the organic solvent. It should be noted that in order to dissolve the PA granules in the organic solvent under normal pressure, the first temperature ($T_1$) is set to be equal to or higher than the melting point ($T_m$) of the PA granules under normal pressure. When the first temperature (T1) of the step S1 is too high, the PA granules will degrade in the organic solvent, and the appearance of the resultant PA powders cannot meet the requirements of SLS technology.

In addition, the composition is maintained at $T_1$ for the first time period ($t_1$) to allow the PA granules to be completely dissolved in the organic solvent, and thus having a desired particle diameter. When the first time period is insufficient, the PA granules cannot be completely dissolved in the organic solvent, and the resultant PA powders have unsatisfactory bulk density. When the first time period is too long, the resultant PA powders may have a particle diameter that is too small, and also have unsatisfactory bulk density.

In an exemplary embodiment, the PA granules are PA12 having a melting point ranging from 178° C. to 180° C., $T_1$ ranges from 180° C. to 184° C., the weight ratio of PA12 to NMP ranges from 0.125 to 0.2, and $t_1$ ranges from 10 minutes to 30 minutes. In another exemplary embodiment, the PA granules are PA1012 having a melting point ranging from 180° C. to 190° C., $T_1$ ranges from 180° C. to 190° C., the weight ratio of PA1012 to NMP ranges from 0.11 to 0.17, and $t_1$ ranges from 40 minutes to 60 minutes.

Step S2: cooling the heated composition to a second temperature ($T_2$) to nucleate the dissolved PA granules, followed by maintaining at the second temperature ($T_2$) to crystallize, so as to forma crystallization product. The difference between $T_m$ and $T_2$ is within a range of 15° C. to 33° C., i.e., $15°\ C. \leq T_m - T_2 \leq 33°\ C$. In certain embodiments, the second temperature ($T_2$) is maintained for a second time period ($t_2$), which may be 60 minutes.

It should be noted that when the cooling step of S2 is conducted too slowly, the resultant PA powders tend to form aggregation, which would affect the bulk density of the powders. When the cooling step of S2 is conducted too quickly, the resultant PA powders are likely to be in a shape of snowflakes, which affects the bulk density. That is, when the cooling step of S2 is conducted too quickly or too slowly, the resultant PA powders would have unsatisfactory bulk density to meet the requirement for SLS. In certain embodiments, in Step S2, the cooling is conducted at a rate ranging from 0.5° C./min to 1° C./min.

In addition, when $T_2$ is too low, the resultant PA powders tend to form aggregation, which would affect the bulk density of the powders. When $T_2$ is too high, the resultant PA powders tend to form aggregation with irregular appearance, which also affect the final bulk density. In an exemplary embodiment where the PA granules are PA12, $T_2$ is within a range of 152° C. to 158° C. In another exemplary embodiment where the PA granules are PA1012, $T_2$ is within a range of 157° C. to 163° C.

Steps S3a: cooling the crystallization product to precipitate polyamide, so as to form a precipitated product. In certain embodiments, the crystallization product was cooled to a temperature at which PA starts to precipitate (such as 100° C.). When Step S3a is conducted too quickly, the resultant PA powders tend to form aggregation, which would affect the bulk density of the powders. Therefore, in certain embodiments, Step S3a is conducted at a rate ranging from 0.5° C./min to 1° C./min. In certain embodiments, the precipitated product is further cooled from the temperature at which PA starts to precipitate to room temperature.

Step S4: washing the precipitated product to remove the organic solvent.

Step S5: drying the washed product obtained in step S4 to obtain a dried product.

Step S6: milling the dried product to obtain the milled product.

Step S7: sieving the milled product to obtain the PA powders.

According to the disclosure, a second embodiment of the method of preparing PA powders is similar to the first embodiment, except that after Step 3a, the method of the second embodiment further includes Step 3b, in which the precipitated product is cooled from the temperature at which PA starts to precipitate to a temperature ($T_3$) ranging from 40° C. to 50° C. for more than, e.g., 12 hours naturally. Step 3b is included for making the PA powders with a more rounded shape. In certain embodiment, the precipitated product is cooled to the temperature ranging from 40° C. to 50° C.

The disclosure will be further described by way of the following examples. However, it should be understood that the following examples are solely intended for the purpose of illustration and should not be construed as limiting the disclosure in practice.

EXAMPLES

General Experimental Materials
1. Polyamide 12 (PA12) granule is purchased from Evonik (Model No.: DAIAMID® X1988), which has a melting point ranging from 178° C. to 180° C. and has a particle diameter around 2 mm.
2. PA1012 granule is purchased from Shandong Dongchen New Technology Co., Ltd., which has a melting point ranging from 180° C. to 190° C. and has a particle diameter around 2 mm.
3. N-methyl-2-pyrrolidone (NMP) is purchased from Henry Chemical Co., Ltd., which has a purity of 99%.
4. $TiO_2$ is purchased from GO YEN Chemical industry Co., Ltd. (Model No.: GR-90), which has a particle diameter around 100 μm.
5. $SiO_2$ is purchased from Henry Chemical Co., Ltd. (Model No.: Crystal EG-11085), which has a particle diameter around 150 μm.

Preparation of Polyamide (PA) Powders from PA12 Granules

Example 1 (E1)

A composition that includes 150 g of PA12 granules, 1.5 g of $SiO_2$ serving as a nucleating agent and 1200 g of NMP serving as an organic solvent, were added into a reaction pot, which was placed in a vessel containing silicone oil. The vessel was heated on a heating plate under normal pressure (i.e., 1 atm) to a first temperature ($T_1$) of 180° C. in 60 minutes, followed by maintaining at the first temperature for a first time period ($t_1$) of 10 minutes, so as to completely dissolve the PA12 granules in NMP.

Afterwards, the heated composition was cooled from $T_1$ to a second temperature ($T_2$) of 155° C. at a first cooling rate ($CR_1$) of 0.51° C./min, followed by maintaining at the second temperature for a second time period ($t_2$) of 60 minutes, so as to nucleate and crystallize the dissolved PA12. The resulting crystallization product was cooled to 100° C. at a second cooling rate of 0.82° C./min ($CR_2$) to precipitate PA12, and then the heating plate was turned off. The reaction pot containing the thus obtained precipitated product was then transferred from the vessel onto a stainless steel plate, followed by naturally cooling to room temperature for more than 6 hours. After pouring into a beaker, the precipitated product was washed with water followed by filtration with a 200-mesh sieve. The resulting residue from the filtration was further subjected to wash and filtration for two or three times, so as to remove NMP, thereby obtaining a clear filtrate that contains a precipitated PA.

Later, the filtrate was dried in an oven (100° C.) for 24 hours. After cooling to room temperature, the dried product was milled in a ball mill (3-10 mm, available from Hong Yu Instrument Co. Ltd., Taiwan) loaded with 500 g of zirconia beads for 6 hours. The thus obtained milled product was sequentially sieved through a 60-mesh sieve, a 80-mesh sieve and a 100-mesh sieve from top to bottom in a sieve shaker (80-300 mesh, available from Der Shuenn Co. Ltd., Taiwan) for 10 minutes. The resulting residues on the 80-mesh sieve and the 100-mesh sieve were collected, so as to obtain the PA powders of Example 1.

Examples 2 to 13 (E2-E13)

The compositions for preparing the PA powders of E2 to E13 were similar to that of E1, except that the weight ratios of PA12 granules to the organic solvent in E2 to E4 are 0.1625, 0.1875 and 0.2, respectively. In addition, in E5 to E7, a combination of $SiO_2$ and $TiO_2$ served as the nucleating agent, and the amount of $TiO_2$ is equal to or higher than that of $SiO_2$. The components of the composition in each example were shown in Table 1.

The polyamide powders of E2 to E13 were made by procedures similar to those of E1, except that as shown in Table 2, the heating periods to reach the first temperature ($T_1$) of E2 to E13 are modified to be within a range of 60 minutes to 90 minutes, and the first time periods ($t_1$) of E2 to E13 range from 10 minutes to 30 minutes. Both of the first and second cooling rates ($CR_1$ and $CR_2$) of E2 to E13 are controlled to be within a range of about 0.5° C./min to about 1° C./min. In addition, after turning off the heating plate, the reaction pot containing the precipitated product of each of E11 to E13 was still placed in the vessel (rather than transferring onto the stainless steel plate) to naturally cool for 14 hours to a temperature ($T_3$) ranging from around 40° C. to 50° C.

Comparative Examples 1 to 8 (CE1-CE8)

The compositions for preparing the PA powders of CE1 to CE8 were the same as that of E1 (see Table 1).

The polyamide powders of CE1 to CE8 were made by procedures similar to those of E1 to E10, except that at least one of the preparation conditions of CE1 to CE8 is modified so as to fall outside the corresponding given range, which is shown by in bold in Table 2. Specifically, referring to Table 2, the first temperature ($T_1$) of CE1 is set to 173° C., which is below the melting point of PA12. The first time period ($t_1$) of CE2 is 60 minutes. The first cooling rates ($CR_1$) of CE1 and CE3 are below 0.5° C./min, and that of CE4 is higher than 1.0° C./min. The second temperatures ($T_2$) of CE5 and CE6 are not within the range of 152° C. to 158° C. The second cooling rates ($CR_2$) of CE4 and CE7 are below 0.5° C./min, and that of CE8 is higher than 1.0° C./min.

Comparative Examples 9 to 10 (CE9-CE10)

The polyamide powders of CE9 to CE10 were made by procedures similar to those of CE1, except for the preparation conditions of CE9 to CE10, which are within the given ranges of CE1 to CE10, as shown in Table 2.

However, the compositions for preparing the PA powders of CE9 to CE10 were similar to that of E6, except for the amounts of PA12 granules and the nucleating agent which fall outside the desired amount ranges, as shown by in bold in Table 1. Specifically, the amounts of PA12 granules and $SiO_2$ in CE9 are 18 g (i.e., exceeding the saturation solubility of the PA12 granules in NMP) and 0.18 g, respectively. In addition, the amount of $SiO_2$ in CE10 is 0.0495 g, which is higher than that of $TiO_2$.

TABLE 1

Components of the composition

| | PA granules | Nucleating agent | | Organic solvent NMP | Weight ratio of PA granules to organic solvent |
|---|---|---|---|---|---|
| | PA12 (g) | $SiO_2$ (g) | $TiO_2$ (g) | (g) | |
| E1 | 150 | 1.500 | 0 | 1200 | 0.125 |
| E2 | 11.7 | 0.117 | 0 | 72 | 0.1625 |
| E3 | 13.5 | 0.135 | 0 | 72 | 0.1875 |
| E4 | 14.4 | 0.144 | 0 | 72 | 0.2 |
| E5 | 9.0 | 0.0450 | 0.0450 | 72 | 0.125 |
| E6 | 9.0 | 0.0405 | 0.0495 | 72 | 0.125 |
| E7 | 9.0 | 0.0360 | 0.0540 | 72 | 0.125 |
| E8 | 150 | 1.500 | 0 | 1200 | 0.125 |
| E9 | 150 | 1.500 | 0 | 1200 | 0.125 |
| E10 | 150 | 1.500 | 0 | 1200 | 0.125 |
| E11 | 150 | 1.500 | 0 | 1200 | 0.125 |
| E12 | 150 | 1.500 | 0 | 1200 | 0.125 |
| E13 | 150 | 1.500 | 0 | 1200 | 0.125 |
| CE1 | 150 | 1.500 | 0 | 1200 | 0.125 |
| CE2 | 150 | 1.500 | 0 | 1200 | 0.125 |
| CE3 | 150 | 1.500 | 0 | 1200 | 0.125 |
| CE4 | 150 | 1.500 | 0 | 1200 | 0.125 |
| CE5 | 150 | 1.500 | 0 | 1200 | 0.125 |
| CE6 | 150 | 1.500 | 0 | 1200 | 0.125 |
| CE7 | 150 | 1.500 | 0 | 1200 | 0.125 |
| CE8 | 150 | 1.500 | 0 | 1200 | 0.125 |
| CE9 | 18.0 | 0.1800 | 0 | 72 | 0.25 |
| CE10 | 9.0 | 0.0495 | 0.0405 | 72 | 0.125 |

TABLE 2

Preparation conditions

| | Heating period min | $T_1$ °C. | $t_1$ min | $CR_1$ °C./min | $T_2$ °C. | $t_2$ min | $CR_2$ °C./min | $T_3$ °C. |
|---|---|---|---|---|---|---|---|---|
| E1 | 60 | 180 | 10 | 0.51 | 155 | 60 | 0.82 | N/A |
| E2 | 75 | | 10 | 0.80 | 155 | | 0.77 | N/A |
| E3 | 75 | | 10 | 0.90 | 155 | | 0.81 | N/A |
| E4 | 75 | | 10 | 0.80 | 155 | | 0.73 | N/A |
| E5 | 70 | | 10 | 0.90 | 155 | | 0.98 | N/A |
| E6 | 75 | | 10 | 0.90 | 155 | | 0.98 | N/A |
| E7 | 70 | | 10 | 0.90 | 155 | | 0.98 | N/A |
| E8 | 90 | | 30 | 0.50 | 155 | | 0.52 | N/A |
| E9 | 75 | | 20 | 0.54 | 155 | | 0.56 | N/A |
| E10 | 80 | | 10 | 0.625 | 155 | | 0.58 | N/A |
| E11 | 80 | | 30 | 0.66 | 155 | | 0.54 | 40~50 |
| E12 | 70 | | 20 | 0.73 | 155 | | 0.58 | 40~50 |
| E13 | 60 | | 10 | 0.51 | 155 | | 0.82 | 40~50 |
| CE1 | 70 | 173 | 30 | 0.30 | 155 | 60 | 0.70 | N/A |
| CE2 | 70 | 180 | 60 | 0.55 | 155 | | 0.71 | N/A |
| CE3 | 75 | 180 | 30 | 0.30 | 155 | | 0.70 | N/A |
| CE4 | 65 | 180 | 30 | 1.30 | 155 | | 0.45 | N/A |
| CE5 | 80 | 180 | 30 | 0.8 | 150 | | 0.61 | N/A |
| CE6 | 75 | 180 | 30 | 0.57 | 160 | | 0.58 | N/A |
| CE7 | 65 | 180 | 30 | 0.62 | 155 | | 0.40 | N/A |
| CE8 | 65 | 180 | 30 | 0.66 | 155 | | 1.30 | N/A |
| CE9 | 75 | 180 | 10 | 0.96 | 155 | | 0.71 | N/A |
| CE10 | 70 | 180 | 10 | 0.90 | 155 | | 0.98 | N/A |

Note:
The temperature error between the set temperature ($T_1$ or $T_2$) and the temperature detected on the heating plate may be neglected.

Analysis of Bulk Density and Appearance of PA Powders Prepared from PA12 Granules The PA powders of each of E1 to E13 and CE1 to CE10 were subjected to bulk density determination using LAB-ULK305 bulk density tester. The appearance and particle diameter of the PA powders of each of E1 to E13 and CE1 to CE10 were respectively analyzed by an optical microscope (KEYENCE VHX-S15), and the yield of the PA powders obtained from PA12 granules were calculated. The results are summarized in Table 3.

TABLE 3

| | Bulk density (g/cm³) | Powder appearance | Particle diameter (μm) | Yield (%) |
|---|---|---|---|---|
| E1 | 0.458 | fine spherical, distinct particles | 50 | 92.3 |
| E2 | 0.449 | fine spherical particles with partial aggregation | 50 | 87.2 |
| E3 | 0.492 | fine spherical particles with partial aggregation | 45 | 71.1 |
| E4 | 0.468 | fine spherical particles with partial aggregation | 57 | 73.6 |
| E5 | 0.529 | fine spherical, distinct particles | 59 | 87.5 |
| E6 | 0.534 | fine spherical, distinct particles | 59 | 81.8 |
| E7 | 0.520 | fine spherical, distinct particles | 52 | 85.7 |
| E8 | 0.443 | fine spherical particles with partial aggregation | 42 | 88.0 |
| E9 | 0.468 | fine spherical particles with partial aggregation | 47 | 82.6 |
| E10 | 0.426 | fine spherical particles with partial aggregation | 50 | 75.3 |
| E11 | 0.489 | fine spherical, distinct particles | 35 | 86.6 |
| E12 | 0.443 | fine spherical, distinct particles | 38 | 76 |
| E13 | 0.458 | fine spherical, distinct particles | 50 | 82 |
| CE1 | 0.390 | aggregated | 52 | 72.0 |
| CE2 | 0.388 | small, aggregated | 35 | 82.0 |
| CE3 | 0.383 | aggregated | 35 | 84.6 |
| CE4 | 0.390 | aggregated | 42 | 86.6 |
| CE5 | 0.388 | aggregated | 31 | 77.3 |
| CE6 | 0.365 | aggregated | 47 | 70.2 |
| CE7 | 0.460 | aggregated | 40 | 94.0 |
| CE8 | 0.360 | aggregated | 32 | 77.3 |
| CE9 | N/A | Powder-free and solidified agglomeration | N/A | N/A |
| CE10 | 0.525 | fine spherical, distinct particles, but not white | 55 | 71.0 |

Figure 21:
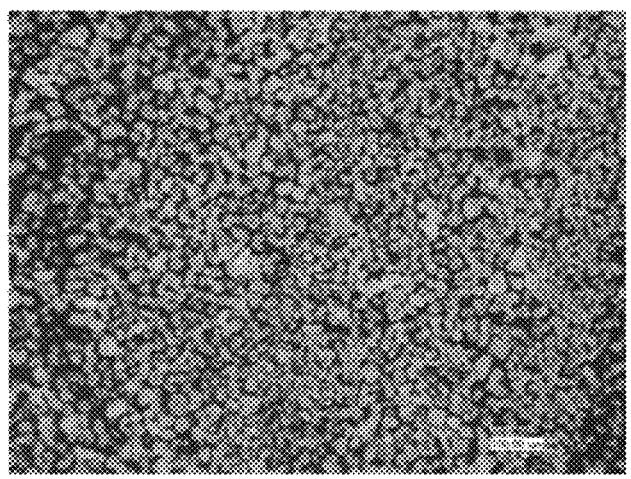
Figure 22:
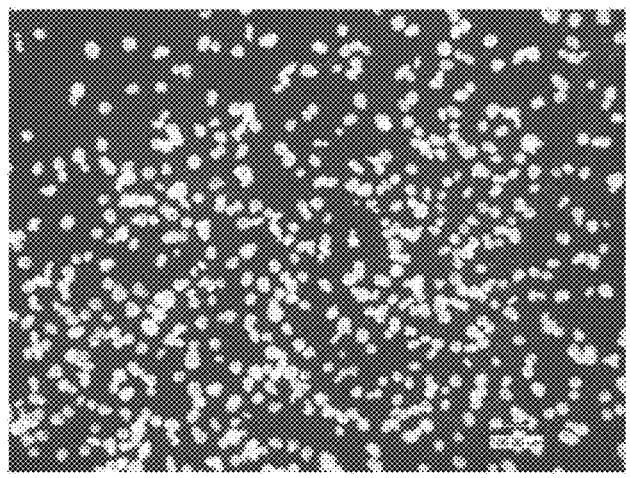
Figure 23:
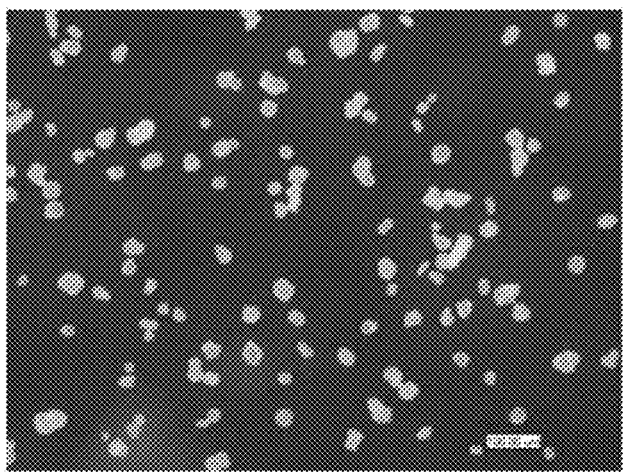
Figure 24:
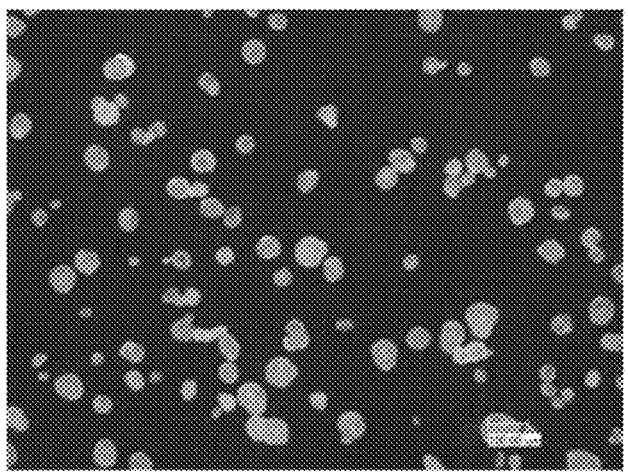
FIGS. 24 to 32 are optical microscope (OM) images respectively showing the appearances of the PA powders of CE11 to CE19.
Figure 25:
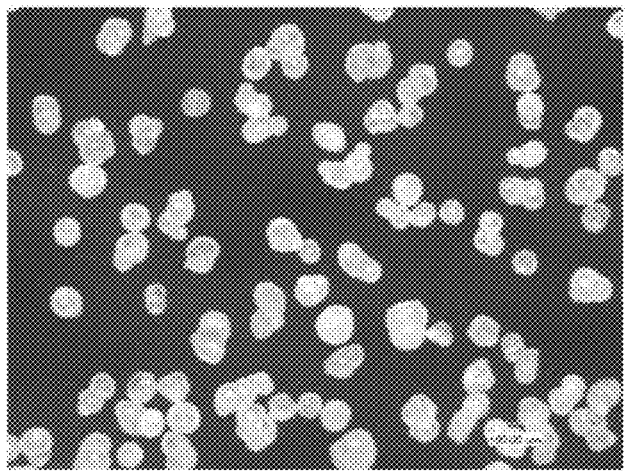
Figure 26:
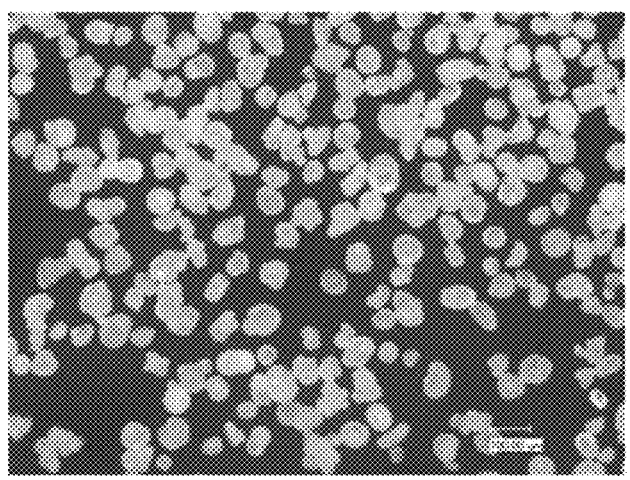
Figure 27:
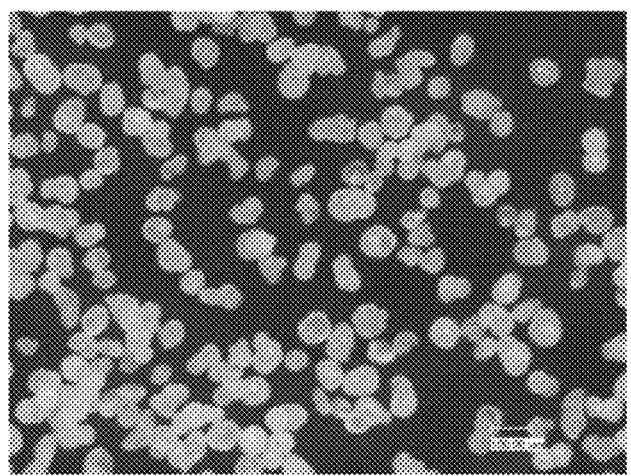
Figure 28:
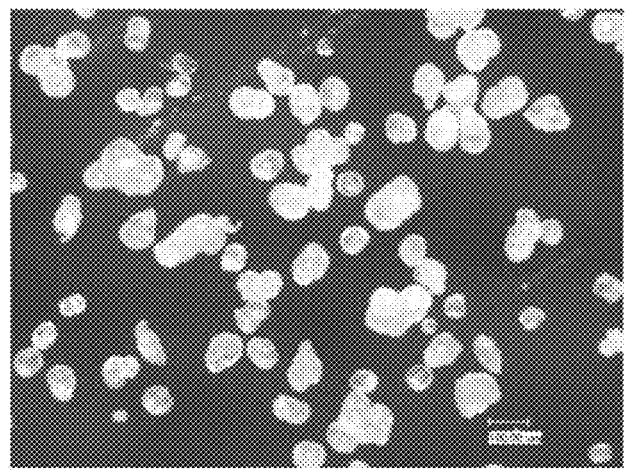
Figure 29:
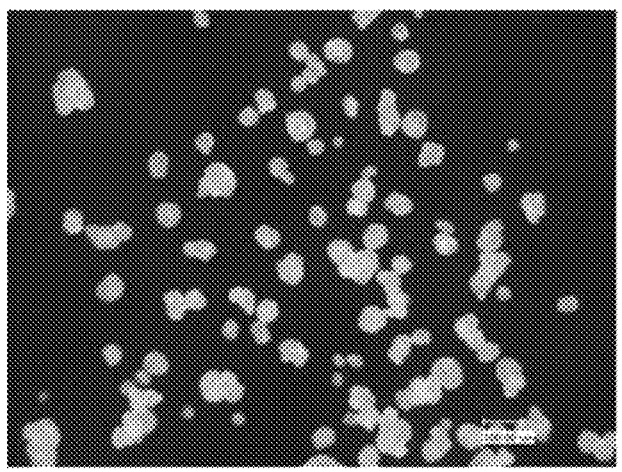
Figure 30:
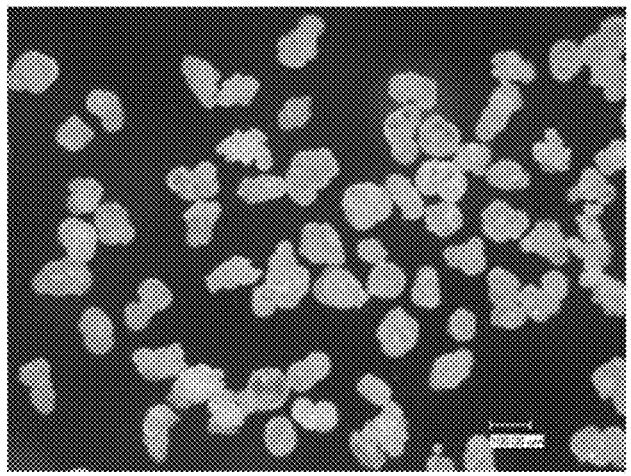
Figure 31:
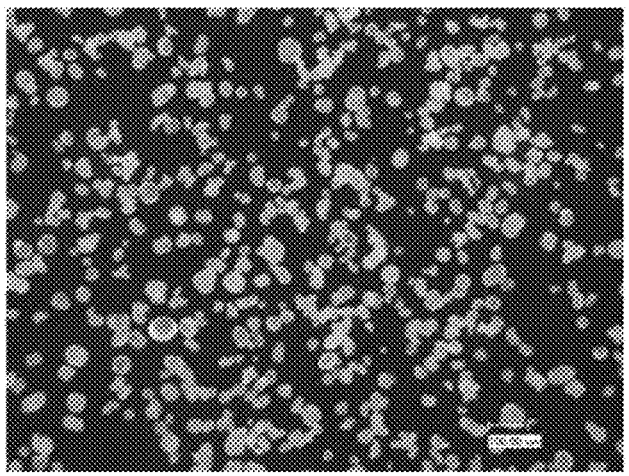
Figure 32:
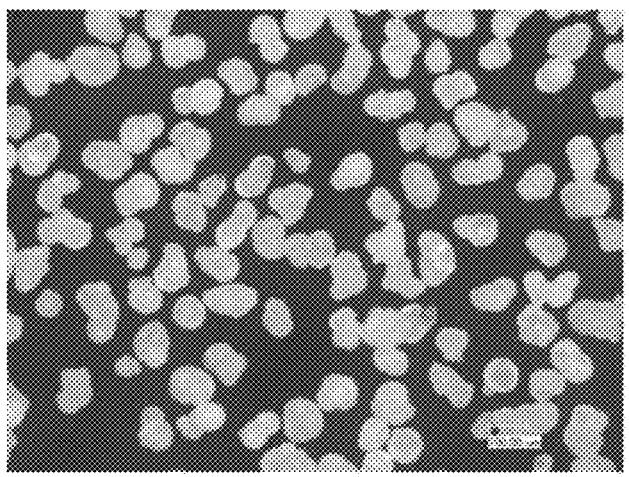
Figure 33:
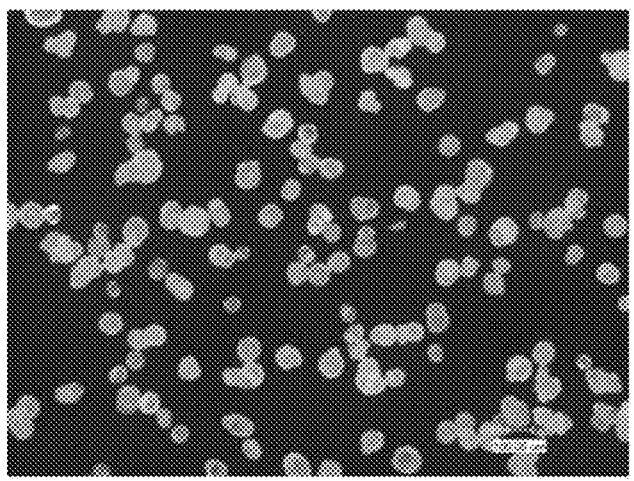
FIGS. 33 to 41 are optical microscope (OM) images respectively showing the appearances of the PA powders of E14 to E22.
Figure 34:
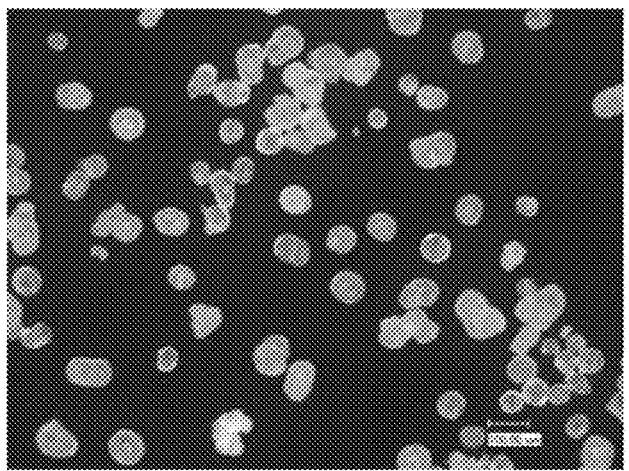
Figure 35:
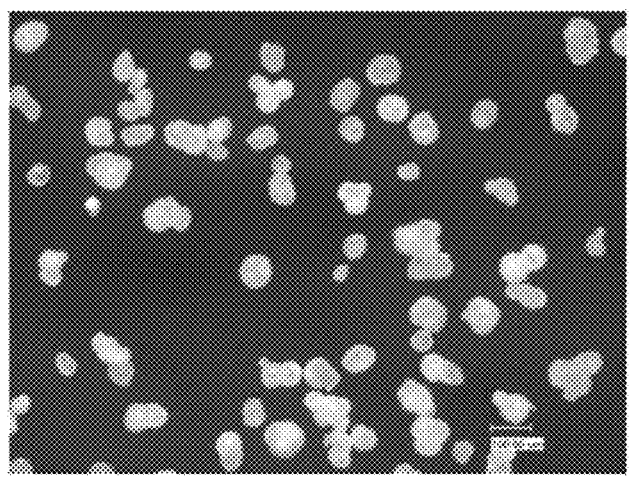
Figure 36:
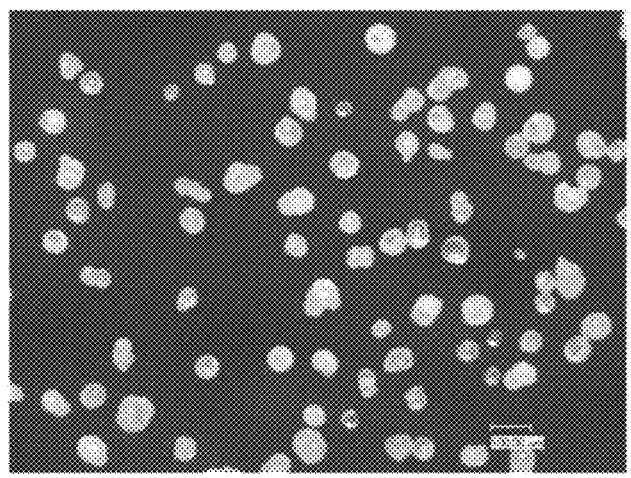
Figure 37:
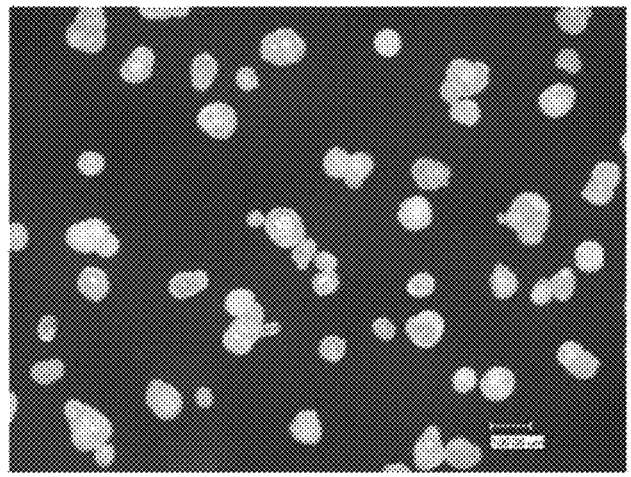
Figure 38:
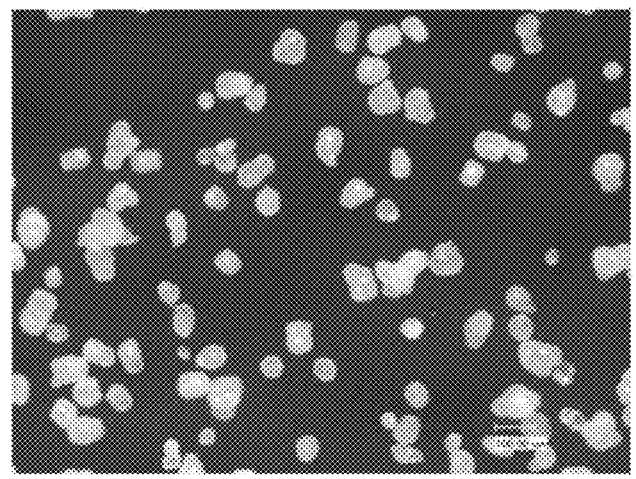
Figure 39:
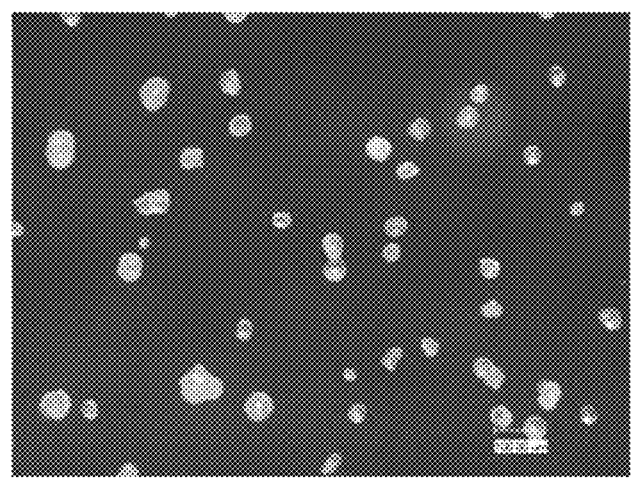
Figure 40:
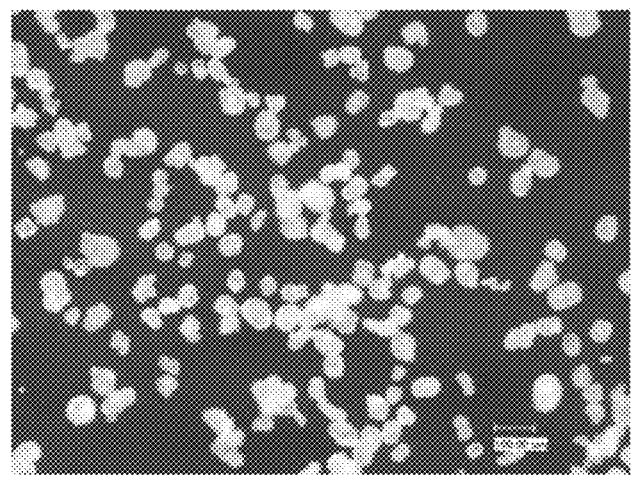
Figure 41:
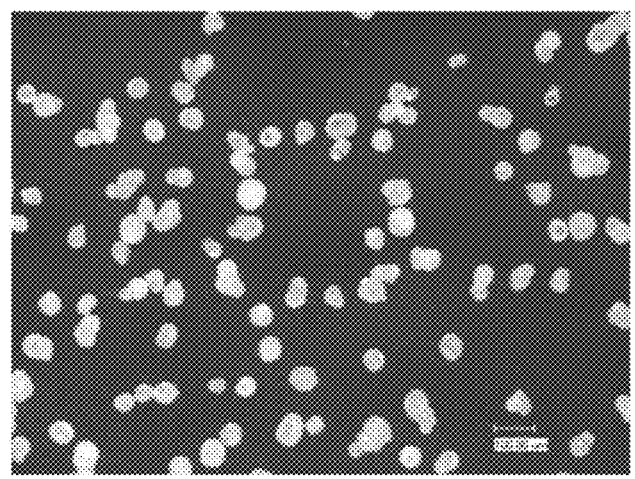

As shown in Table 3, as compared to CE1 to CE8, the PA powders of E1 to E13 prepared under the desired preparation conditions exhibit relatively higher bulk densities (i.e., at least 0.426 g/cm³), less aggregation and a yield higher than 71%. In particular, the PA powders of E11 to E13 (see FIGS. 21 to 23 respectively) have a more rounded shape than those of E1 to E10, which may be contributed to the step of naturally cooling the precipitated product to a temperature ranging from around 40° C. to 50° C., rather than to room temperature. Further, the particle diameters of the PA powders of E8 to E10 are gradually increased from 42 μm to 50 μm as the first time period (t1) is decreased progressively. As shown by FIGS. 2 to 9, the PA powders of CE1 to CE8 have a particle diameter ranging from around 30 μm to around 50 μm and form aggregation. In contrast, the PA powders of E1 to E13 have a relatively higher particle diameter (about 35 μm to around 60 μm), and from fine spherical, distinct particles with less aggregation (see FIGS. 11 to 23). The results indicate that, when the composition is heated to $T_1$ lower than the melting point ($T_m$) of the PA granules under normal pressure (i.e., CE1) and maintained at $T_1$ for a too long period (i.e., CE2), and/or the heated composition containing dissolved PA is cooled to undesired $T_2$ (i.e., CE5 to CE6) at a cooling rate that falls outside the range of 0.5°

C./min to 1.0° C./min (i.e., CE3-CE4), and/or the crystallization product is cooled at a cooling rate that falls outside the range of 0.5° C./min to 1.0° C./min (i.e., CE7-8), the thus obtained PA powder would form undesired aggregation, which may result in a decreased bulk density.

Figure 10:
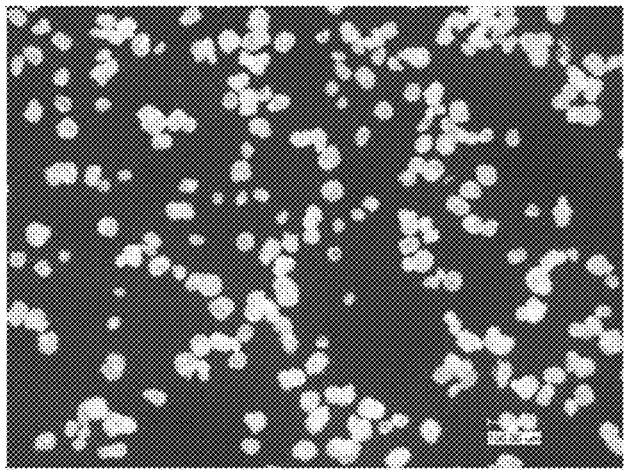
Figure 11:
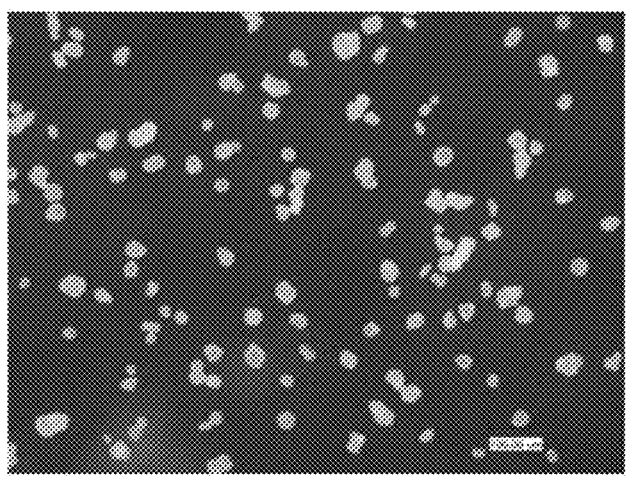
FIGS. 11 to 23 are optical microscope (OM) images respectively showing the appearances of the PA powders of Example 1 (E1) to E13.
Figure 12:
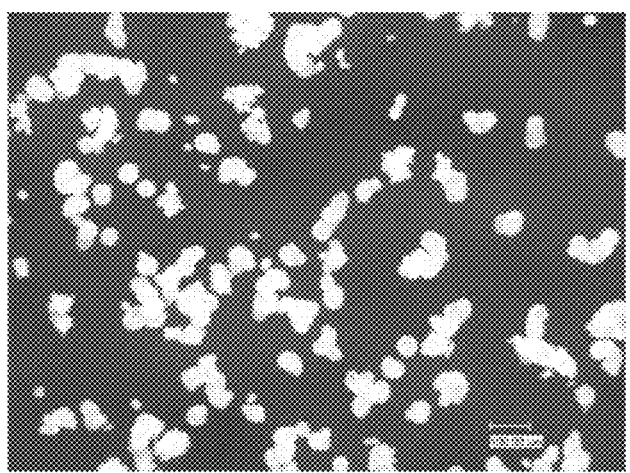
Figure 13:
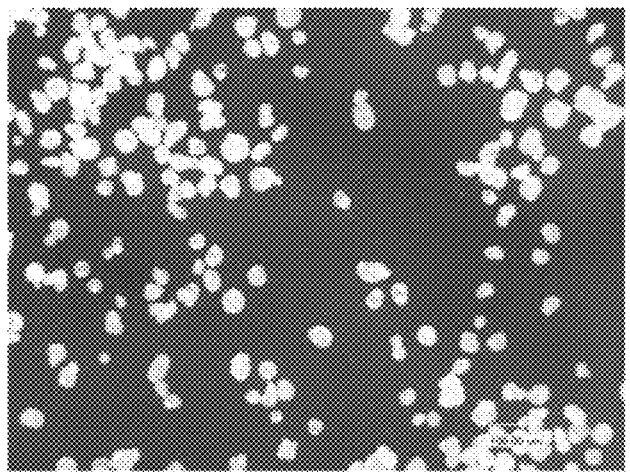
Figure 14:
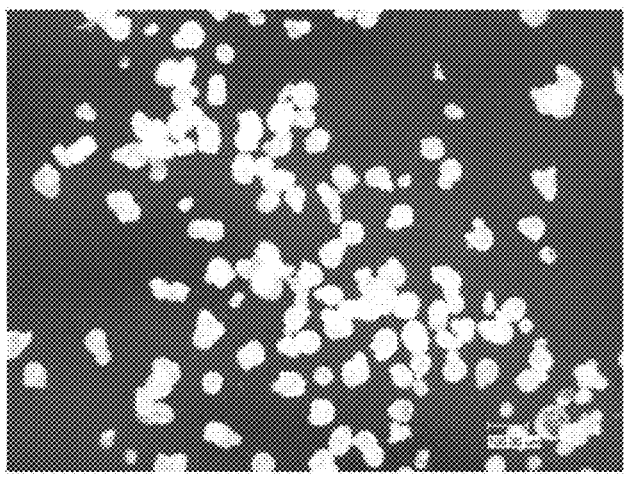
Figure 15:
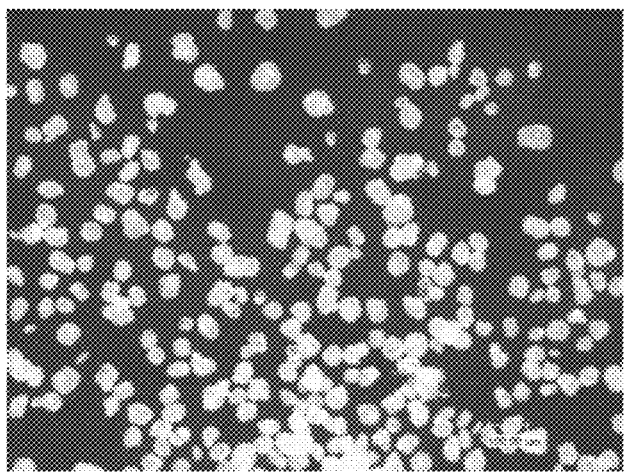
Figure 16:
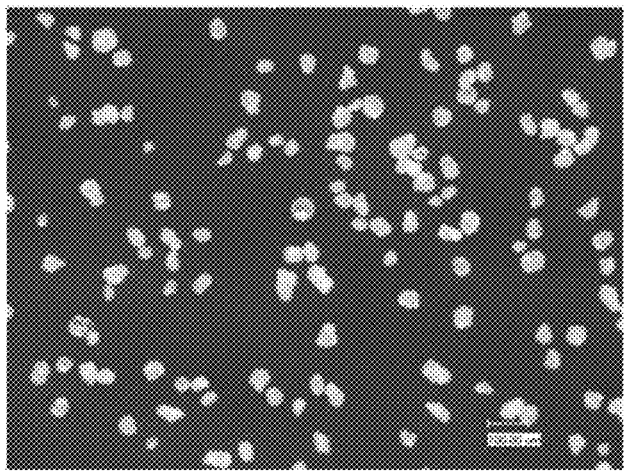
Figure 17:
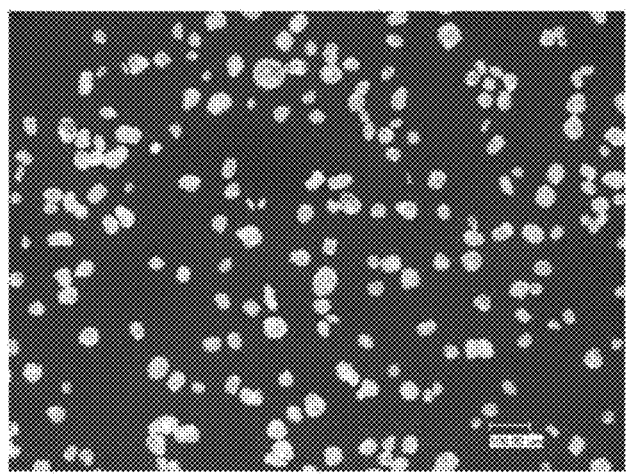
Figure 18:
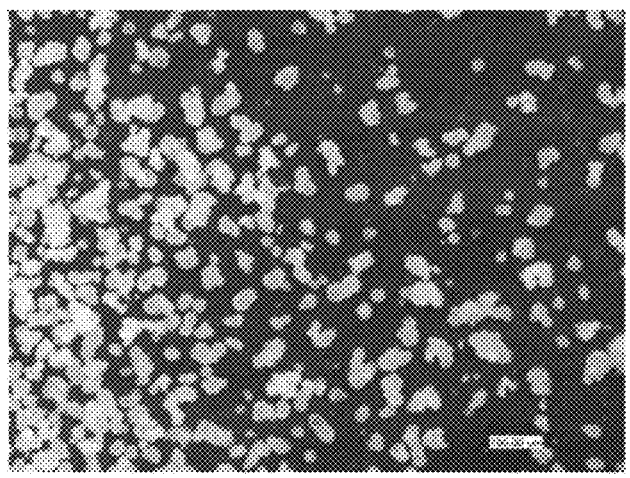
Figure 19:
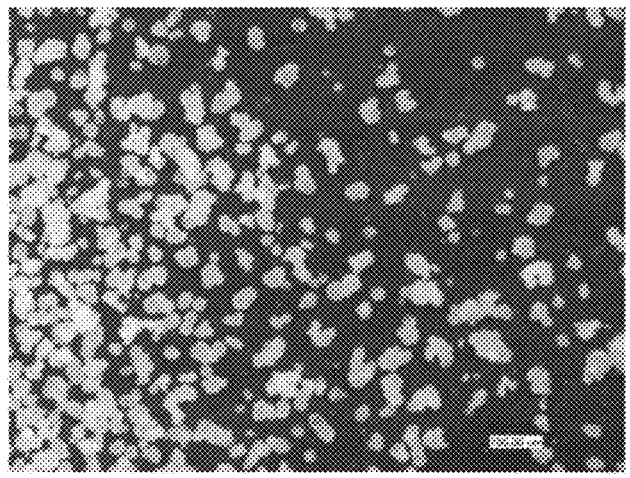
Figure 20:
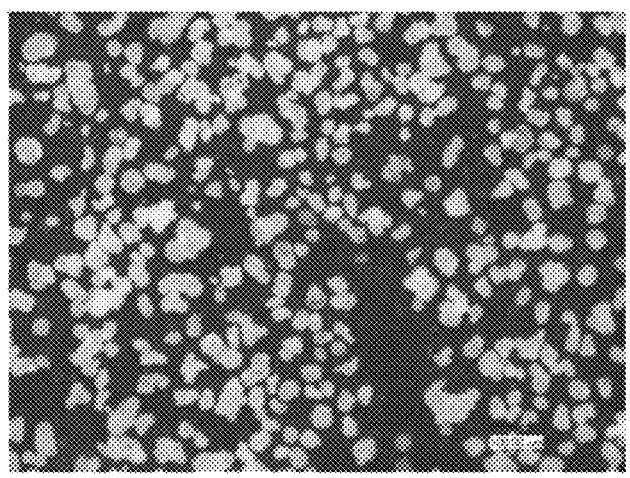

On the other hand, the component ratio of the composition is also important to the PA powder obtained therefrom. Specifically, with respect to CE9, the PA12 granules cannot fully dissolved in NMP, and thus no PA powder was observed even under the above mentioned preparation conditions, which indicates the weight ratio of the PA granules to the organic solvent has to be controlled to have a value that is not higher than the saturation solubility of the PA granules in the organic solvent. Moreover, it can be seen from FIG. 10 and Table 3 that, although the PA powders of CE10 have a bulk density of 0.525 g/cm$^3$, such PA powders are not white and merely have a yield of 62%, and thus are not suitable for industrial applications. The result suggests that when SiO$_2$ and TiO$_2$ served as the nucleating agents, the amount of SiO$_2$ has to be not higher than that of TiO$_2$.

Preparation of PA Powders from PA1012 Granules

Examples 14 to 22 (E14-E22)

The compositions for preparing the PA powders of E14 to E22 were similar to that of E1, except that the PA granules used in E14 to E22 are PA1012, and the weight ratio of PA granules to the organic solvent are within a range of around 0.11 to around 0.17. In addition, a combination of SiO$_2$ and TiO$_2$ served as the nucleating agent in E11 to E19, and the amount of TiO$_2$ is equal to or higher than that of SiO$_2$. The components of the composition in each of E14 to E22 are shown in Table 4.

The PA powders of E14 to E19 and E20 to E22 were respectively made by procedures similar to those of E1 and E11, except that the preparation conditions are slightly modified as shown in Table 5. Specifically, the heating period to reach T$_1$ and the first time period (t$_1$) of each of E14 to E22 are respectively modified to be within a range of 45 minutes to 75 minutes and a range of 40 minutes to 60 minutes. The second temperature (T$_2$) of each of E14 to E22 is set to 160° C.

Comparative Examples 11 to 17 (CE11-CE17)

The component ratio (such as the weight ratio of the polyamide granules to the nucleating agent) of each composition for preparing the PA powders of CE11 to CE17 is the same as those of E20, and the detailed amount of each component is summarized in Table 4.

The PA powders of CE11 to CE17 were made by procedures similar to those of E14 to E20, except that at least one of the preparation conditions of CE14 to CE17 is modified to fall outside the corresponding given range, which is shown by in bold in Table 5. Specifically, referring to Table 5, the first temperature (T$_1$) of CE14 is set to 175° C., which is below the melting point of PA1012. The first time period (t$_1$) of CE12 is 30 minutes. The first cooling rates (CR$_1$) of CE13 and CE14 are respectively higher than 1.0° C./min and below 0.5° C./min. The second temperature (T$_2$) of CE15 is below 160° C. The second cooling rates (CR$_2$) of CE16 and CE17 are respectively higher than 1.0° C./min and below 0.5° C./min.

Comparative Examples 18 to 19 (CE18-CE19)

The PA powders of CE18 to CE19 were respectively made by procedures similar to those of E14 and E20, except for the preparation conditions of CE18 to CE19, which are tabulated in Table 5.

However, the compositions in preparing the PA powders of CE18 and CE19 were similar to those of E14 and E17 respectively, except for the amounts of PA1012 granules and the nucleating agent that fall outside the desired amount ranges as shown by in bold in Table 4. Specifically, the amounts of PA1012 granules and SiO$_2$ in CE18 are 14.4 g (i.e., exceeding the saturation solubility of the PA1012 granules in NMP) and 0.144 g, respectively. In addition, the total amount of SiO$_2$ and TiO$_2$ relative to that of PA granules in CE19 was 0.011, rather than 0.01 (i.e., the weight ratio of the PA granules to the nucleating agent in CE19 is not 100:1).

TABLE 4

| | Components of the composition | | | | |
|---|---|---|---|---|---|
| | PA granules | Nucleating agent | | Organic solvent of | Weight ratio PA granules to organic |
| | PA1012 (g) | SiO$_2$ (g) | TiO$_2$ (g) | NMP (g) | solvent |
| E14 | 9.0 | 0.090 | 0 | 81 | 0.1111 |
| E15 | 11.7 | 0.117 | 0 | 81 | 0.1444 |
| E16 | 13.5 | 0.135 | 0 | 81 | 0.1667 |
| E17 | 10.0 | 0.050 | 0.050 | 90 | 0.1111 |
| E18 | 10.0 | 0.045 | 0.055 | 90 | 0.1111 |
| E19 | 10.0 | 0.040 | 0.060 | 90 | 0.1111 |
| E20 | 9.0 | 0.090 | 0 | 81 | 0.1111 |
| E21 | 9.0 | 0.090 | 0 | 81 | 0.1111 |
| E22 | 9.0 | 0.090 | 0 | 81 | 0.1111 |
| CE11 | 9.0 | 0.090 | 0 | 81 | 0.1111 |
| CE12 | 9.0 | 0.090 | 0 | 81 | 0.1111 |
| CE13 | 20.0 | 0.200 | 0 | 180 | 0.1111 |
| CE14 | 20.0 | 0.200 | 0 | 180 | 0.1111 |
| CE15 | 9.0 | 0.090 | 0 | 81 | 0.1111 |
| CE16 | 20.0 | 0.200 | 0 | 180 | 0.1111 |
| CE17 | 20.0 | 0.200 | 0 | 180 | 0.1111 |
| CE18 | 14.4 | 0.144 | 0 | 81 | 0.1778 |
| CE19 | 10.0 | 0.050 | 0.060 | 90 | 0.1111 |

TABLE 5

| | Preparation conditions | | | | | | | |
|---|---|---|---|---|---|---|---|---|
| | Heating period to reach T$_1$ min | T$_1$ ° C. | t$_1$ min | CR$_1$ ° C./min | T$_2$ ° C. | t$_2$ min | CR$_2$ ° C./min | T$_3$ ° C. |
| E14 | 45 | 180 | 40 | 0.88 | 160 | 60 | 0.95 | N/A |
| E15 | 45 | | 40 | 0.96 | 160 | | 0.90 | N/A |
| E16 | 60 | | 40 | 0.94 | 160 | | 0.98 | N/A |
| E17 | 75 | | 40 | 0.98 | 160 | | 0.80 | N/A |
| E18 | 75 | | 40 | 0.85 | 160 | | 0.80 | N/A |
| E19 | 75 | | 40 | 0.90 | 160 | | 0.82 | N/A |
| E20 | 70 | | 40 | 0.95 | 160 | | 0.96 | 40~50 |
| E21 | 65 | | 50 | 0.80 | 160 | | 0.90 | 40~50 |
| E22 | 65 | | 60 | 0.95 | 160 | | 0.96 | 40~50 |
| CE11 | 40 | 175 | 50 | 0.56 | 160 | 60 | 0.92 | 40~50 |
| CE12 | 75 | 180 | 30 | 0.95 | 160 | | 0.95 | 40~50 |
| CE13 | 45 | 180 | 40 | 1.13 | 160 | | 0.90 | 40~50 |
| CE14 | 60 | 180 | 40 | 0.46 | 160 | | 0.90 | 40~50 |
| CE15 | 70 | 180 | 40 | 0.96 | 155 | | 0.96 | 40~50 |
| CE16 | 65 | 180 | 40 | 0.51 | 160 | | 1.13 | 40~50 |
| CE17 | 80 | 180 | 40 | 0.56 | 160 | | 0.46 | 40~50 |
| CE18 | 45 | 180 | 40 | 0.96 | 160 | | 0.96 | N/A |
| CE19 | 45 | 180 | 40 | 0.98 | 160 | | 0.96 | 40~50 |

Analysis of Bulk Density and Appearance of PA Powders Prepared from PA1012 Granules The PA powders of each of E14 to E22 and CE11 to CE19 were subjected to bulk density determination using LAB-ULK305 bulk density tester. The appearance and particle diameter of the PA powders of each of E14 to E22 and CE11 to CE19 were respectively analyzed by an optical microscope(KEYENCE VHX-S15), and the yield of the PA powders obtained from PA1012 granules were calculated. The results are summarized in Table 6.

TABLE 6

| | Bulk density (g/cm³) | Powder appearance | Particle diameter (μm) | Yield (%) |
|---|---|---|---|---|
| E14 | 0.570 | fine spherical, | 70 | 81.5 |
| E15 | 0.592 | distinct particles | 70 | 53.7 |
| E16 | 0.533 | | 64 | 40.6 |
| E17 | 0.548 | | 65 | 56.0 |
| E18 | 0.553 | | 72 | 46.4 |
| E19 | 0.599 | | 71 | 60.0 |
| E20 | 0.570 | | 61 | 86.0 |
| E21 | 0.534 | | 60 | 73.7 |
| E22 | 0.541 | | 52 | 84.6 |
| CE11 | 0.574 | fine spherical, distinct particles | 42 | 62.0 |
| CE12 | 0.420 | aggregated, fine spherical particles | 65 | 64.0 |
| CE13 | 0.530 | aggregated | 60 | 47.0 |
| CE14 | 0.531 | aggregated | 65 | 38.0 |
| CE15 | 0.587 | large, fine spherical particles | 80 | 71.0 |
| CE16 | 0.460 | aggregated | 48 | 51.0 |
| CE17 | 0.499 | aggregated | 63 | 54.0 |
| CE18 | 0.484 | aggregated | 45 | 44.4 |
| CE19 | 0.511 | large fine spherical particles | 76 | 37.0 |

As shown in Table 6 and FIGS. 24 to 32, the PA powders of CE11 to CE19 tend to form aggregation and merely have a yield of 38% to 71%. In contrast, the PA powders of E14 to E22 prepared under the desired preparation conditions generally exhibit relatively higher bulk densities (larger than 0.53 g/cm³), have a relatively higher yield and form fine spherical, distinct particles with less aggregation (see FIGS. 33 to 41), and hence can be used in selective laser sintering (SLS). To be specific, when the composition is heated to $T_1$ lower than the melting point ($T_m$) of the PA granules under normal pressure (i.e., CE11) and maintained at $T_1$ for a too short period (i.e., CE12), and/or the heated composition containing dissolved PA is cooled to undesired $T_2$ (i.e., CE15) at a cooling rate that falls outside the range of 0.5° C./min to 1.0° C./min (i.e., CE13 to CE14), and/or the crystallization product is cooled at a cooling rate that falls outside the range of 0.5° C./min to 1.0° C./min (i.e., CE16 to 17), and/or the composition contains PA1012 granules that exceeds the saturation solubility thereof in the organic solvent (i.e., CE18), and/or the weight ratio of the PA granules to the nucleating agent in the composition is not 100:1, the resultant PA powder would form undesired aggregation and have a relatively low yield, and hence cannot meet the requirement of SLS. In addition, results of E20 to E22 suggested that when the first time period ($t_1$) is increased, the PA powders thus obtained would have a decreased particle diameter.

In view of the foregoing, by controlling the ratio of the PA granules to the organic solvent to be within a range of 0.11 to the saturation solubility of the PA granules in the organic solvent, and by controlling the ratio of the PA granules to the nucleating agent, the composition of this disclosure is capable of preparing PA powders with a desired bulk density and having fine, distinct spherical shape with less aggregation. In addition, by adjusting the preparation conditions including heating the above mentioned composition under normal pressure to $T_1$ that is not lower than the melting point of the PA granules followed by maintaining at $T_1$ for a first time period ($t_1$), and/or by controlling the cooling rates and cooling temperature of the following cooling steps, the yield and bulk density of the PA powders prepared by the method of this disclosure can be significantly improved, and the aggregation of the PA powders can be effectively reduced.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of preparing polyamide powders, comprising the steps of:
   (a) heating a composition including polyamide granules, a nucleating agent and an organic solvent under normal pressure to a first temperature ($T_1$) equal to or higher than the melting point ($T_m$) of the polyamide granules, followed by maintaining at the first temperature for a first time period to dissolve the polyamide granules in the organic solvent;
   (b) cooling the heated composition to a second temperature ($T_2$) to nucleate the dissolved polyamide granules, followed by maintaining at the second temperature ($T_2$) to crystallize, so as to form a crystallization product, in which 15° C.$\leq T_m - T_2 \leq$33° C.;
   (c) cooling the crystallization product to precipitate polyamide, so as to form a precipitated product; and
   (d) washing the precipitated product to remove the organic solvent,
   wherein the weight ratio of the polyamide granules to the organic solvent ranges from 0.11 to saturation solubility of the polyamide granules in the organic solvent, and the weight ratio of the polyamide granules to the nucleating agent is 100:1.

2. The method as claimed in claim 1, wherein the organic solvent has a boiling point ranging from 190° C. to 209° C.

3. The method organic solvent as claimed in claim 2, wherein the organic solvent is N-methyl-2-pyrrolidone.

4. The method as claimed in claim 2, wherein the polyamide granules are selected from a group consisting of PA12, PA1012, PA11, PA1212 and combinations thereof.

5. The method as claimed in claim 4, wherein in step (b), the cooling is conducted at a rate ranging from 0.5° C./min to 1° C./min, and in step (c), the cooling is conducted at a rate ranging from 0.5° C./min to 1° C./min.

6. The method as claimed in claim 5, wherein:
the polyamide granules are PA12, and the weight ratio of PA12 to the organic solvent ranges from 0.125 to 0.2;
in step (a), the first temperature ranges from 180° C. to 184° C., and the first time period ranges from 10 minutes to 30 minutes; and
in step (b), the second temperature ranges from 152° C. to 158° C.

7. The method as claimed in claim 5, wherein:
the polyamide granules are PA1012, and the weight ratio of PA1012 to the organic solvent ranges from 0.11 to 0.17;
in step (a), the first temperature ranges from 180° C. to 190° C., and the first time period ranges from 40 minutes to 60 minutes; and
in step (b), the second temperature ranges from 157° C. to 163° C.

8. The method as claimed in claim 1, wherein the nucleating agent is $SiO_2$.

9. The method as claimed in claim 1, wherein the nucleating agent is a combination of $SiO_2$ and $TiO_2$, and $TiO_2$ is present in an amount equal to or higher than that of $SiO_2$ by weight.

10. The method as claimed in claim 9, wherein $TiO_2$ is present in an amount ranging from 50% to 60% based on the total weight of the nucleating agent.

11. The method as claimed in claim 1, further comprising the step of cooling the precipitated product to a temperature ranging from 40° C. and 50° C. after step (c) and before the step (d).

12. The method as claimed in claim 1, further comprising the steps of:
(e) drying the washed product obtained in step (d) to obtain a dried product;
(f) milling the dried product to obtain the milled product; and
(g) sieving the milled product, so as to obtain the polyamide powders.

* * * * *